(12) United States Patent
Nehl et al.

(10) Patent No.: US 7,308,975 B2
(45) Date of Patent: Dec. 18, 2007

(54) VELOCITY SENSING SYSTEM FOR A DAMPER

(75) Inventors: Thomas W. Nehl, Shelby Township, MI (US); Fang Deng, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 127 days.

(21) Appl. No.: 11/005,111

(22) Filed: Dec. 6, 2004

(65) Prior Publication Data

US 2005/0120795 A1    Jun. 9, 2005

Related U.S. Application Data

(60) Provisional application No. 60/527,604, filed on Dec. 5, 2003.

(51) Int. Cl.
*F16F 15/03* (2006.01)

(52) U.S. Cl. .............. 188/267; 188/267.2; 188/322.12

(58) Field of Classification Search ................ 188/164, 188/267, 267.1, 267.2, 280, 266.1, 322.12, 188/322.19, 1.11 E, 299.1
See application file for complete search history.

(56) References Cited

U.S. PATENT DOCUMENTS

| | | | | |
|---|---|---|---|---|
| 5,009,450 | A | * | 4/1991 | Herberg et al. .......... 188/266.1 |
| 5,191,283 | A | * | 3/1993 | Gesenhues .................. 324/174 |
| 5,233,293 | A | * | 8/1993 | Huang et al. .......... 324/207.15 |
| 5,238,092 | A | * | 8/1993 | Huang ..................... 188/266.2 |
| 5,251,729 | A | * | 10/1993 | Nehl et al. ............... 188/266.1 |
| 5,254,009 | A | * | 10/1993 | Wormann .................... 439/34 |
| 5,451,870 | A | * | 9/1995 | Gesenhues et al. .... 324/207.15 |
| 6,866,127 | B2 | * | 3/2005 | Nehl et al. ............... 188/266.1 |
| 2004/0154887 | A1 | * | 8/2004 | Nehl et al. ............... 188/266.2 |

* cited by examiner

*Primary Examiner*—Pam Rodriguez
(74) *Attorney, Agent, or Firm*—Scott A. McBain

(57) ABSTRACT

A velocity sensor including a damper assembly having a central axis, a magnet extending parallel to the central axis, the magnet having a magnetic axis radially oriented with the central axis, and a coil extending parallel to the central axis and radially oriented with the central axis, wherein movement of the damper assembly with respect to the magnet induces a voltage in the coil.

23 Claims, 6 Drawing Sheets

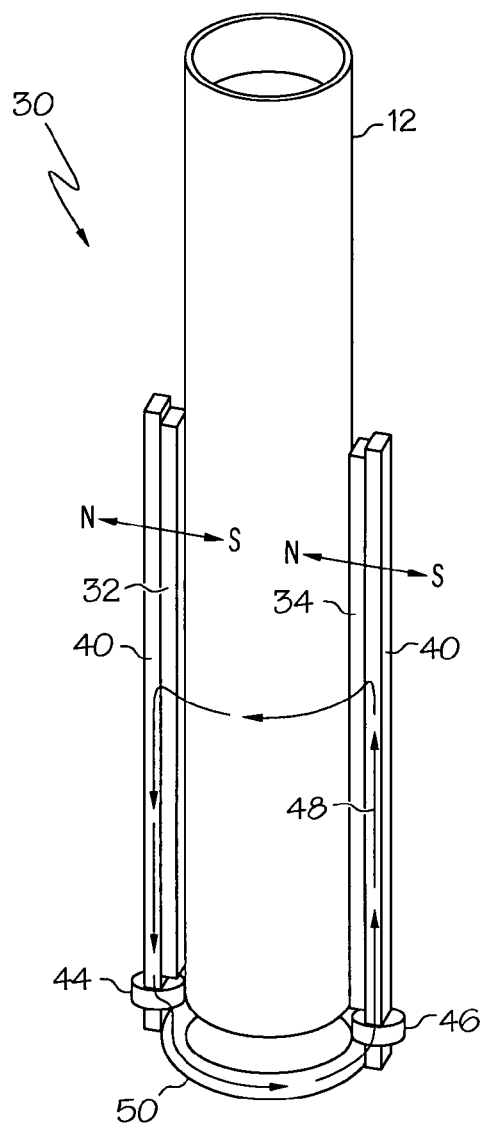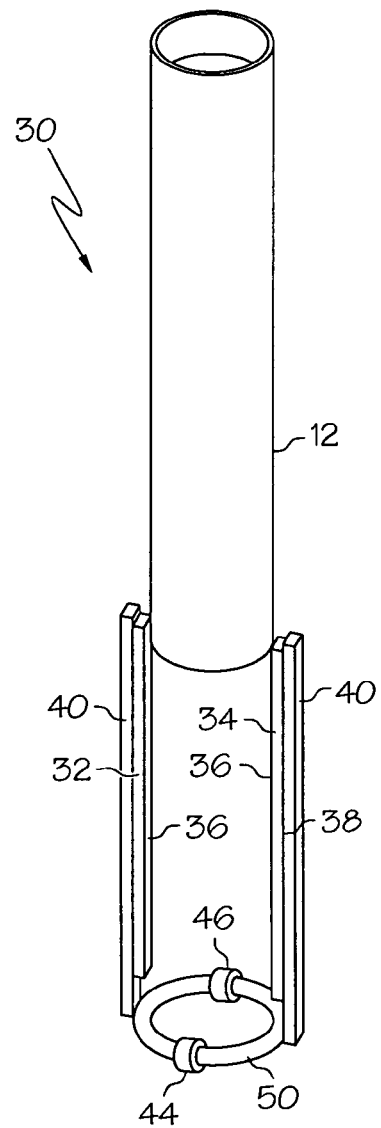
FIG. 2A
(PRIOR ART)
FIG. 2B
(PRIOR ART)

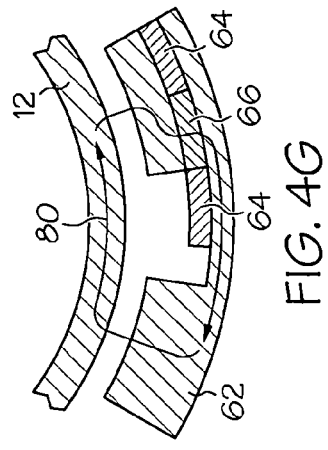
FIG. 4G
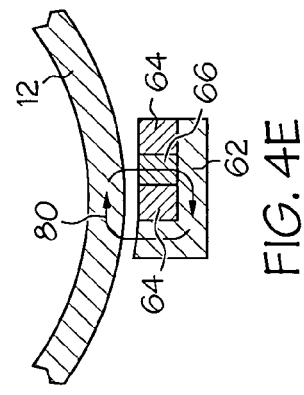
FIG. 4E
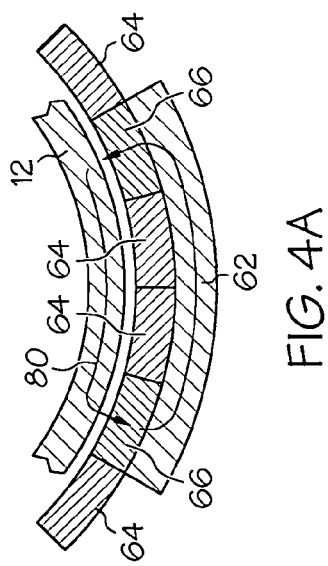
FIG. 4A
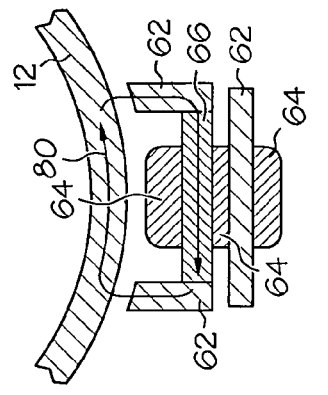
FIG. 4H
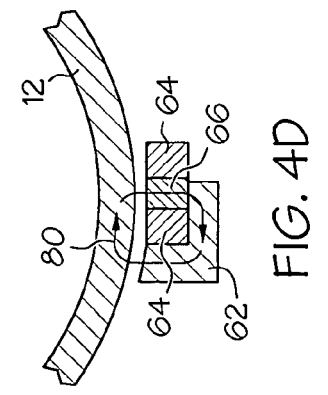
FIG. 4D
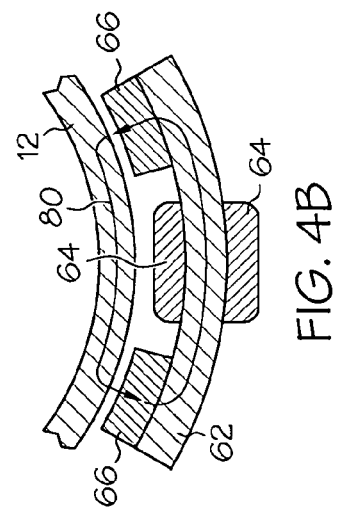
FIG. 4B
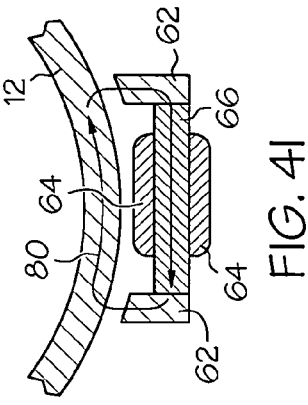
FIG. 4I
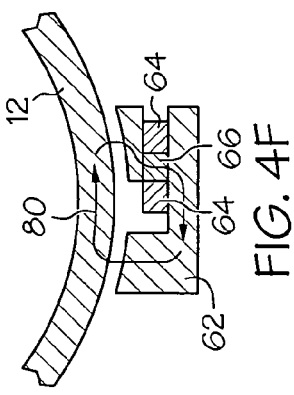
FIG. 4F
FIG. 4C

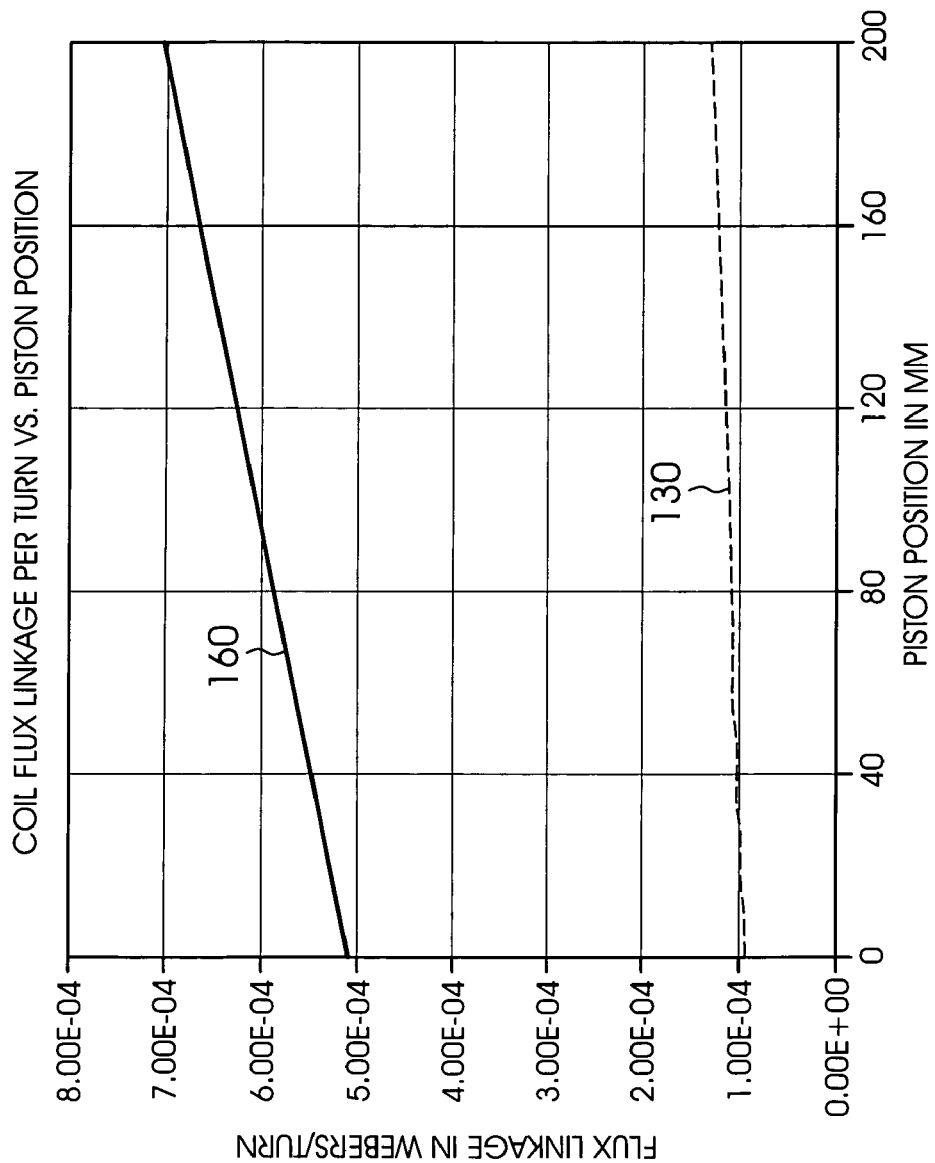

VELOCITY SENSING SYSTEM FOR A DAMPER

This application claims priority from U.S. Provisional Patent App. No. 60/527,604 filed Dec. 5, 2003, the contents from which is incorporated herein by reference.

BACKGROUND

The present invention is directed to a velocity sensing system and, more particularly, to a velocity sensing system for a damper or the like.

A typical damper assembly, such as the one shown in FIG. 1, includes a damper body 12 having a piston (not shown) slidably disposed within the damper body 12. The damper assembly includes a piston rod 14 fixed to the piston and extending outwardly from the damper body 12. The damper assembly typically is associated with a spring and is mounted between a wheel assembly and frame or body of a vehicle, such as an automobile or a truck. The piston is located in a fluid-filled cavity (not shown) of the damper body 12. When a load, shock or vibrational force displaces the associated wheel assembly relative to the vehicle body, the force drives the piston into, or out of, the damper body 12; the movement of the piston through the relatively viscous fluid within the cavity dampens the movement of the wheel in a well-known manner.

The damper assembly also may include a dust tube 16 coaxially received over the damper body 12. The dust tube 16 provides mechanical protection to the damper body 12 and reduces the introduction of dust and other contaminants into the damper body 12. When the damper body 12 is moved relative to the piston and piston rod 14, the damper body 12 moves along its central axis relative to the dust tube 16.

It is often desired to track the state of the damper assemblies of a vehicle so that an on-board control unit may account for the state of such damper assemblies in controlling the damping characteristics of the damper assemblies, as well as during control of braking systems, steering systems and the like. In particular, the control of dampers in real time damping systems requires measurement of the instantaneous relative damper velocity (i.e., the velocity of the piston relative to the damper body 12 or the velocity of the damper body 12 relative to the dust tube 16) as a control variable.

FIG. 1 illustrates a first system, generally designated 10, for determining the velocity of the damper body 12 relative to the dust tube 16. The system 10 includes a concentrated magnet 19 (such as a ring magnet) mounted to the top of the damper body 12. The dust tube 16 includes a coil 20 located on and distributed along its inner surface, with the coil 20 being coaxial with the dust tube 16 and damper body 12. Movement of the damper body 12 relative to the dust tube 16 causes a voltage to be induced in the coil 20, which may then be sensed to determine the damper velocity.

The theoretical or idealized flux of the system 10 is shown as line 22 in FIG. 1. The flux 22 exits the magnet 19 in a radial direction and extends across a radial gap 24 to the dust tube 16. The flux 22 extends up the dust tube 16, radially across the top 26 of the dust tube 16 and axially along the piston rod 14 to return to the magnet 19 to close the flux loop 22.

The system 10 of FIG. 1 may provide adequate data when the stroke of the damper is relatively small (i.e., less than two times the diameter of the damper body 12). However, when the stroke of the damper is relative large (i.e., more than two times or four times the diameter of the damper body 12) the performance of the system 10 of FIG. 1 may be unacceptable. In particular, as the distance of the magnet 19 from the top 26 of the dust tube 16 (through which the flux 22 passes) increases, the size of the flux path 22 increases and flux loss increases accordingly, which degrades the performance of the system 10. Furthermore, the flux 22 of the system 10 of FIG. 1 is sensitive to disruption caused by the radial flux produced by magnetorheological ("MR") fluid type dampers, which typically include solenoids located inside the damper body 12.

FIGS. 2A and 2B illustrate an alternative system, generally designated 30, for determining damper velocity. The system 30 includes two diametrically opposed magnets 32, 34 positioned adjacent to and extending axially along the length of the damper. Each magnet 32, 34 has a polarity such that the long, flat face 36 thereof facing the damper body has a north or south polarity and the opposite face 38 has an opposite polarity. The magnets 32, 34 are mounted such that the faces thereof facing the damper body 12 have opposite polarity. Each magnet 32, 34 is mounted on a flux carrier or flux collector 40 which is part of, or coupled to, an external dust tube (not shown). The system 30 of FIGS. 2A and 2B differs from the system in FIG. 1 in that the magnets 32, 34 are located on the dust tube instead of on the damper body 12 and the magnets 32, 34 are distributed or extend along the entire length of the damper travel rather than being concentrated at the end of the damper tube 12. Conversely, the coil 20 of the system of FIG. 1 that was distributed along the entire length of travel is now concentrated at the top of the dust tube as two separate coils 44, 46.

The idealized flux of the system 30 of FIGS. 2A and 2B is shown therein as flux path 48. The flux travels from the north pole or face of one of the magnets 34 and across the damper body 12 to the south pole of the other magnet 32 in a generally radial or circumferential direction. The flux 48 then travels axially along the flux collector 40 to the top 50 of the dust tube. The flux 48 then travels generally radially or circumferentially to the other flux collector 40 and returns to the north pole of the magnet 34 to close the flux loop 48. The sense coils 44, 46 may be located on the flux collectors 40 (see FIG. 2A) or at the top 50 of the dust cover (see FIG. 2B) to sense the voltage generated by movement of the damper body 12.

The system 30 of FIGS. 2A and 2B can provide a reduced-quality output signal because the flux 48 is required to be carried axially to the top 50 of the dust tube to pass through the coils 44, 46. This requires a relatively long flux path 48 (especially during extended travel or long strokes of the damper body 12) that reduces the signal strength due to flux leakage.

Accordingly, there is a need for a velocity sensing system wherein flux leakage is reduced and signal strength is increased.

SUMMARY

A first embodiment of the present invention provides a velocity sensing system including a damper assembly having a central axis, a magnet extending parallel with the central axis, the magnet having a magnetic axis radially oriented with the central axis, and a coil extending parallel with the central axis and radially oriented with the central axis, wherein movement of the damper assembly with respect to the magnet induces a voltage in the coil.

A second embodiment of the present invention provides a velocity sensor including a damper assembly extending along a central axis, a magnet extending parallel with the central axis, the magnet having a magnetic axis radially oriented with the central axis, and a coil extending parallel with the central axis and radially oriented with the central axis, wherein the damper, magnet and coil form a three-dimensional flux path such that the amount of flux depends upon the position of the damper with respect to the magnet and coil.

A third embodiment of the present invention provides a method for sensing velocity including the steps of providing a damper assembly having a central axis, aligning a magnet and a coil with the central axis such that the magnet and coil extend parallel with the central axis, and moving the damper assembly relative to the magnet and coil to induce a voltage in the coil.

Other embodiments, objects and advantages of the present invention will be apparent from the following description, the accompanying drawings and the appended claims.

BRIEF DESCRIPTION OF THE DRAWINGS

FIG. 2A is a front perspective view of a second prior art velocity sensing system in a jounce position;

FIG. 2B is a front perspective view of the system of FIG. 2A in a rebound position;

FIG. 4A is an alternative embodiment of a magnet/pole/coil assembly of the system of FIG. 3B;

FIG. 4B is an alternative embodiment of a magnet/pole/coil assembly of the system of FIG. 3B;

FIG. 4C is an alternative embodiment of a magnet/pole/coil assembly of the system of FIG. 3B;

FIG. 4D is an alternative embodiment of a magnet/pole/coil assembly of the system of FIG. 3B;

FIG. 4E is an alternative embodiment of a magnet/pole/coil assembly of the system of FIG. 3B;

FIG. 4F is an alternative embodiment of a magnet/pole/coil assembly of the system of FIG. 3B;

FIG. 4G is an alternative embodiment of a magnet/pole/coil assembly of the system of FIG. 3B;

FIG. 4H is an alternative embodiment of a magnet/pole/coil assembly of the system of FIG. 3B;

FIG. 4I is an alternative embodiment of a magnet/pole/coil assembly of the system of FIG. 3B;

FIG. 5 is a graph of flux linkage per turn as a function of axial position.

DETAILED DESCRIPTION

The system of the present invention, generally designated 60, is a self-powered integrated relative velocity sensor with a distributed magnet and coil that may be used with real time damping systems. The system 60 is suitable for use with dampers with a wide range of strokes and is insensitive to common mode magnetic signals as produced by, for example, MR dampers. The output of the sensing system 60 is insensitive to the temperature of the coil (i.e., resistance) since voltage (and not current) is the measurement variable.

Figure 3A:
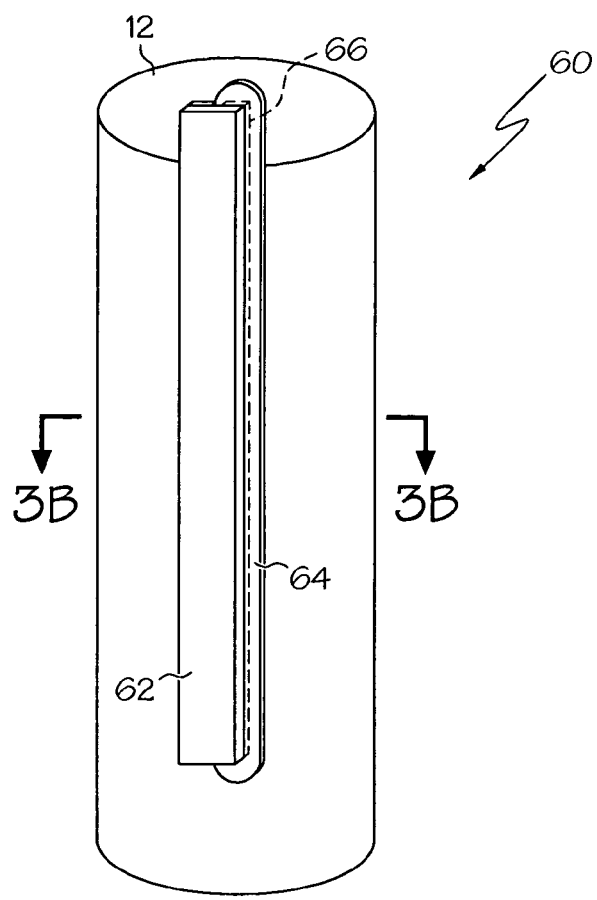
FIG. 3A is front perspective view of the velocity sensing system of the present invention.
Figure 3B:
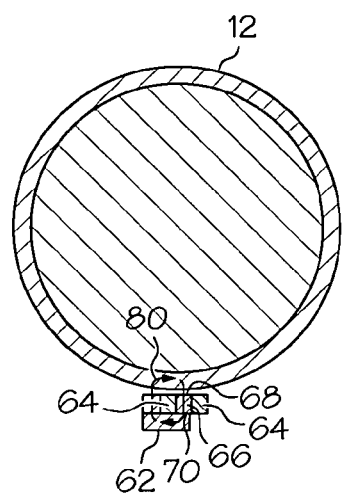
FIG. 3B is a top plan view of a section of the system of FIG. 3A taken along line 3B-3B of FIG. 3A.

As shown in FIGS. 3A and 3B, the system 60 includes a soft iron pole 62, which is part of, or mounted on, the inside of a dust tube (not shown) of a damper. The soft iron pole 62 is oriented generally axially relative to the dust tube and damper body 12 and extends generally the entire length of the dust tube. The system 60 further includes a coil 64 that is coupled to the soft iron pole 62. The coil 64 is wrapped around a magnet 66 that is coupled to the coil 64 and/or soft iron pole 62. Both the magnet 66 and the coil 64 extend generally the entire axial length of the soft iron pole 62 and dust tube. The magnet 66 has a polarity such that the long, flat face 68 facing the damper body 12 has a north or south polarity and the opposite face 70 (i.e., facing the soft iron pole 62) has an opposite polarity. The soft iron pole 62 provides structural support to the coil 64 and magnet 66 and also acts as a flux carrier.

Thus, the system 60 uses a magnet 66 and a coil 64 mounted on a soft magnetic iron pole or flux carrier 62 as part of an external dust tube. This differs from the systems 10, 30 of FIGS. 1 and 2 in that a magnet 66 is located on the dust tube and is distributed along the entire length of the damper travel, instead of the concentrated magnet at the end of the damper body 12, as in the system of FIG. 1, or the two distributed magnets on the dust tube as in the system of FIG. 2. Furthermore, the coils 20, 44, 46 of the systems of FIGS. 1 and 2 that were distributed along the entire length of travel or concentrated at the top of the dust tube are now wrapped around the magnet 66 that extends along the entire length of damper travel.

The idealized flux path 80 of the system 60 is shown in FIG. 3B. The flux path 80 extends in a clockwise direction from the north face 70 of magnet 66, through the soft iron pole 62, across a gap to the damper body 12, circumferentially along the damper body 12 and finally across another gap to the south face 68 of the magnet 66 to complete the closed loop 80. Thus, the flux path 80 may be generally square or circular in top view. However, the flux is three-dimensional and may extend generally axially along the entire length of the soft iron pole 62, coil 64 and magnet 66. Therefore, the idealized flux may be visualized as a "tube" which may be generally square or generally circular in cross section extending along the soft iron pole 62, magnet 66 and coil 64.

Figure 1:
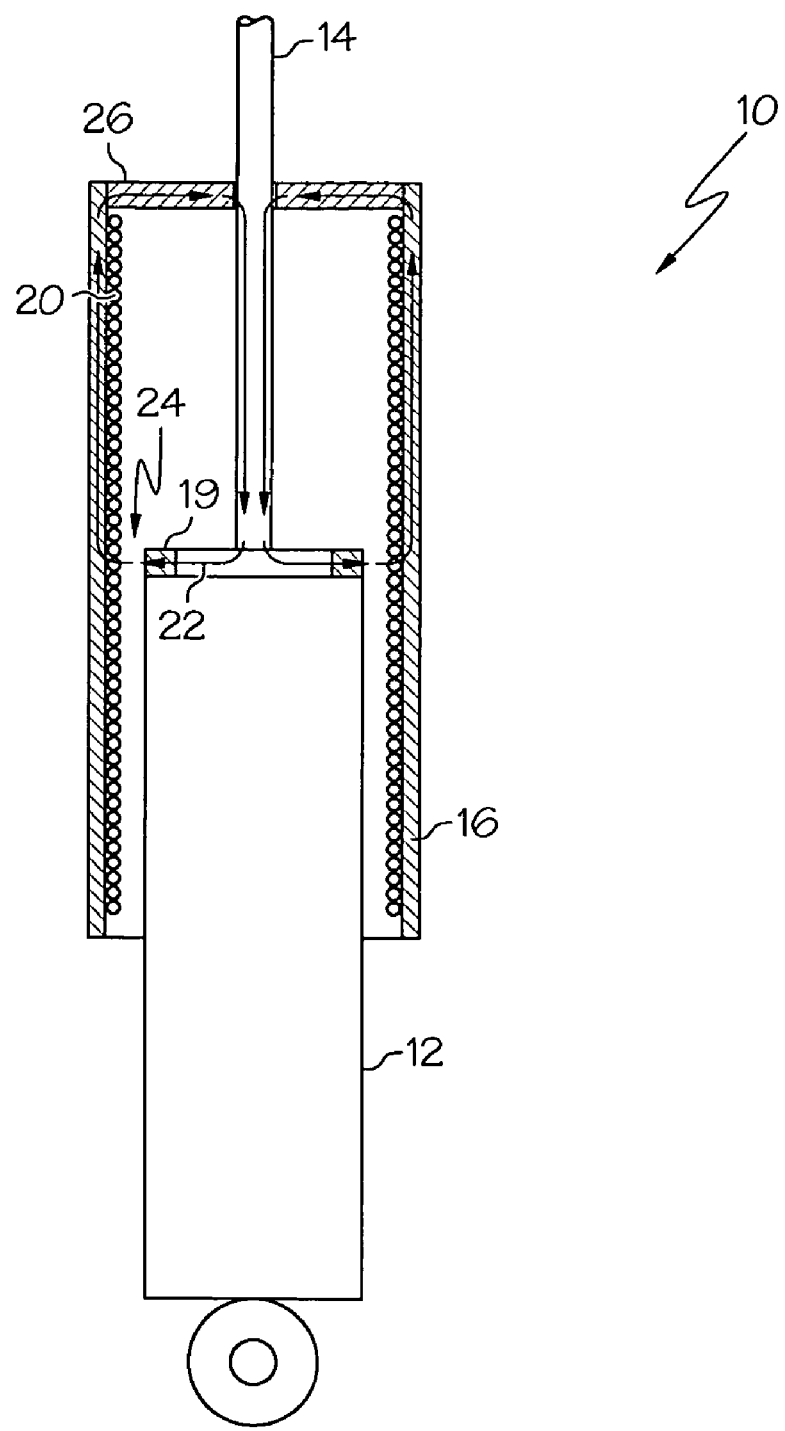
FIG. 1 is a front elevational view, shown partially in section, of a first prior art velocity sensing system.

The flux path 80 is relatively small, especially as compared to the systems 10,30 of FIGS. 1 and 2. Therefore, the flux leakage is significantly reduced and signal strength is significantly increased.

When the damper body 12 is moved relative to the dust tube, the damper body 12 moves axially relative to the soft iron pole 62, coil 64 and magnet 66. Thus, movement of the damper tube 12 relative to the soft iron pole 62, coil 64 and magnet 66 creates a voltage in the coil 64 that is directly proportional to the relative velocity. When the damper body 12 of the system 60 is moved downwardly, the total flux is reduced. In other words, the axial overlap between the damper tube 12 and the soft iron pole 62, coil 64 and magnet 66 is reduced, and the length of the idealized three-dimensional flux "tube" is reduced.

Movement of the damper tube 12 when there is reduced overlap produces a lower coil flux linkage as compared to when there is greater overlap and thus higher coil flux linkage. Ideally, the relation between flux linkage and damper position is a linear relationship, starting with a minimum value when there is no overlap between the damper tube 12 and magnet, and rising uniformly to a maximum value when there is complete overlap between the damper body 12 and the magnet 66. Thus, as can be seen in Eq. 1 discussed below, the linear relationship ensures that the induced voltage is directly proportional to the relative velocity.

Because the voltage induced in the coil 64 by movement of the damper body 12 has a directly proportional, or nearly directly proportional, relationship with the velocity of the damper body 12 relative to the dust tube, this represents a significant improvement over the systems 10, 30 of FIGS. 1, 2A and 2B. In particular, the systems 10, 30 may have exponential or other non-linear relationships between induced voltage and velocity that cause difficulty in determining the velocity of the damper tube. Furthermore, as will be discussed in greater detail below, the system or sensor 60 of the present invention has greater sensitivity than those of FIGS. 1, 2A and 2B.

FIGS. 3A and 3B illustrate a sensor system 60 with a radially oriented magnet 66 and coil 64. By a "radially oriented magnet" it is meant that the magnetic axis of the magnet 66 (which extends between the poles of the magnet) is radially oriented with respect to the central axis of the dust tube/damper body 12. By a "radially oriented coil" it is meant that the central axis of the coil 64 is radially oriented with respect to the central axis of the dust tube/damper body 12.

Figure 4J:
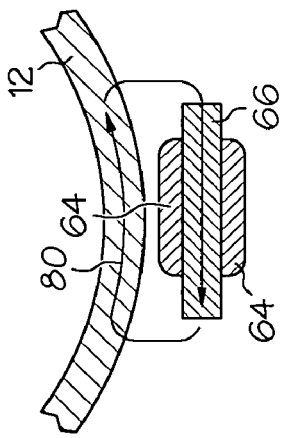
FIG. 4J is an alternative embodiment of a magnet/pole/coil assembly of the system of FIG. 3B.
Figure 4K:
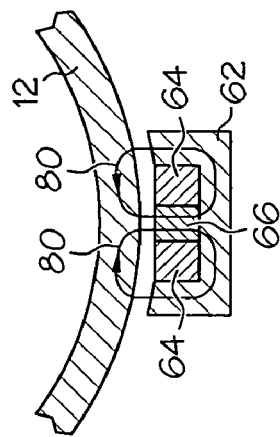
FIG. 4K is an alternative embodiment of a magnet/pole/coil assembly of the system of FIG. 3B.
Figure 4L:
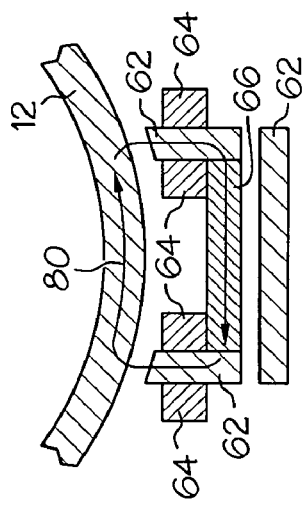
FIG. 4L is an alternative embodiment of a magnet/pole/coil assembly of the system of FIG. 3B.
Figure 4M:
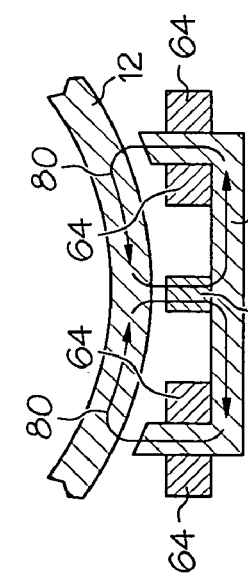
FIG. 4M is an alternative embodiment of a magnet/pole/coil assembly of the system of FIG. 3B.
Figure 4N:
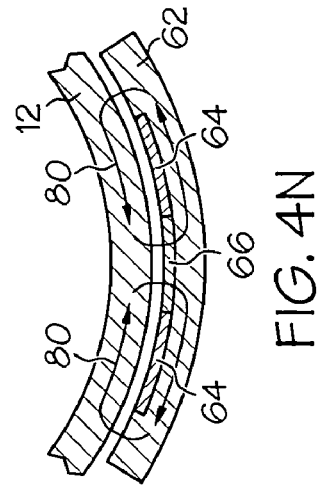
FIG. 4N is an alternative embodiment of a magnet/pole/coil assembly of the system of FIG. 3B.
Figure 4O:
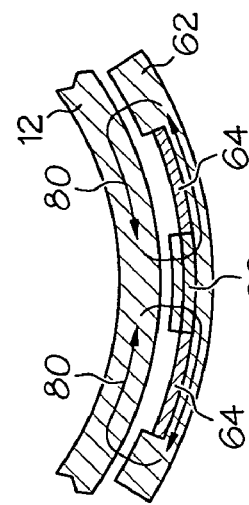
FIG. 4O is an alternative embodiment of a magnet/pole/coil assembly of the system of FIG. 3B.

FIGS. 4A through 4O illustrate variations upon the general concept shown in FIG. 3B. A design with dual radially oriented magnets 66 and dual radially oriented coils 64 is shown in FIG. 4A. FIG. 4B illustrates a design with a single radially oriented circumferential coil 64. The term "circumferential coil" means that the central axis of the coil 64 is oriented with the circumferential direction relative to the central axis of the dust tube/damper body. Thus, for example, the coil 64 of FIG. 4B may be wound about the soft iron pole 62 such that the coil 64 is wrapped around the long flat faces of the soft iron pole 62 facing the damper body 12 and on the opposite side of the soft iron pole 62. The curved soft magnetic iron cores shown in these figures can also be straight with the magnets mounted perpendicular to the core.

A variety of single radially oriented magnet 66/pole 62/coil 64 designs are shown in FIGS. 4C through 4G. FIG. 4D illustrates the configuration shown in FIG. 3B. Some of these configurations have controlled leakage paths that are useful for magnets requiring high load lines (e.g., Alnico magnets). A number of radially oriented circumferential coil designs are shown in FIGS. 4H through 4K. The configuration shown in FIG. 4K, has a controlled leakage path that is useful for magnets requiring high load lines. The configuration shown in FIG. 4L may be preferred due to its symmetrical shape and the coil shielding/protection provided by the dual radial iron poles. Finally there are a number of configurations possible with a single radial magnet 66 and dual soft iron poles, as shown in FIGS. 4L through 4O. Many additional configurations are possible by distributing two or more of these sensors around the circumference of the dust tube. These sensors can be connected together electrically to boost the sensor output and/or to suppress output variations due to non-uniform air gap between the damper body 12 and the dust tube resulting from vibrations or manufacturing tolerances or both.

The voltage induced in the coil 64 due to the motion of the damper body 12 relative to the sensor (i.e., soft magnetic iron pole 62, magnet 66 and coil 64) is given by the following equation:

$$V_{coil} = \frac{d\lambda}{dt} = \frac{\partial \lambda}{\partial z} \cdot \frac{dz}{dt} \qquad \text{(Eq. 1)}$$

It can be shown that the derivative of the flux linkage (λ) with respect to the axial position (z) is a constant and therefore it follows that:

$$\frac{\partial \lambda}{\partial z} = k_E \qquad \text{(Eq. 2)}$$

The second term in (Eq. 1) is the relative velocity between the stationary sensor assembly and the moving damper body; that is:

$$\frac{dz}{dt} = \text{Velocity} \qquad \text{(Eq. 3)}$$

Hence the sensor's induced voltage is directly proportional to the relative damper velocity as follows:

$$V_{coil} = \frac{d\lambda}{dt} = \frac{\partial \lambda}{\partial z} \cdot \frac{dz}{dt} = k_E \cdot \text{Velocity} \qquad \text{(Eq. 4)}$$

Thus, a voltage sensor may monitor the voltage induced in the coil and a control unit may convert the induced voltage signal into a relative damper velocity signal by application of Eq. 4.

As long as eddy current effects are minimal and the coil current is close to zero the sensor output will show little delay in the velocity signal. The coil voltage can also be integrated to produce a signal proportional to the position of the damper as follows:

$$z(t) = z(t_{reset}) + \int \frac{V_{coil}}{K_E} dt \qquad \text{(Eq. 5)}$$

The initial position of the damper body 12, $z(t_{reset})$, can be obtained by a Hall effect sensor or equivalent magnetic sensor that is affixed to the damper body 12 in any number of ways known to those skilled in the art. The Hall effect sensor can be fixed at an arbitrary location (i.e., at the center of the stroke of the piston) such that the integration step of Equation 5 can be utilized during each stroke to accurately track the position of the piston. The integration of the coil voltage as described by Eq. 5 from the time a reset signal is generated, $t_{reset}$, to the current time, t, can be accomplished by a simple analog circuit as known to those skilled in the art or by various other means.

The flux linkage per turn as a function of axial position for the prior art system 30 and the system 60 of the present invention are shown in FIG. 5. Line 160 corresponds to the system 60 of the present invention and line 130 corresponds to the prior art system 30 of FIG. 2. It can be seen that the upper line 160 displays a linear or nearly linear relationship between flux (and flux linkage) and position as is desired for a velocity sensor. Furthermore, the slope of the line (corresponding to the constant $K_E$) for the system 60 of FIG. 3 is 980 mv/(m/s), which is almost three times the slope of the line for the system 30 of FIG. 2.

Thus, the output of the system 60 of FIG. 3 is significantly greater than that of the system 30 of FIGS. 2A and 2B while using significantly less magnet material and soft magnetic iron structures. Thus, the system 60 of the present invention provides significantly higher output at less cost. Furthermore, the high level of output of the system 60 of the present invention may eliminate the need for amplification or on-board sensor electronics. Higher outputs can also be achieved through additional turns, wider magnets and flux collectors, better magnets, and by distributing a number of these sensors along the circumference of the dust tube, as described above.

Finally, because the system and sensor 60 of the present invention includes a flux path that is oriented in a radial plane of the dust tube/damper body 12, the system 60 is less prone to disturbance by the components of a MR damper. In particular, operation of the piston in a MR damper may cause magnetic flux lines to be formed in a radial plane of the dust tube/damper body 12 that radiate outwardly from the MR piston that is referred to here as a "common mode field" with respect to the sensor. However, because the flux path of the system of the present invention is also oriented in a radial plane, the magnetic flux cause by a MR piston does not have a net effect upon the flux of the sensor since the coil is sensitive only to differential radial fields, and therefore the common mode component causes little or no disturbance. In contrast, for example, the system of FIG. 1 is sensitive to the common mode field (i.e., a field that is constant in sign or in radial direction at a given z position) while rejecting a differential mode field (i.e., a field that varies in sign or in radial direction at a given z position) and therefore would be sensitive to any fields produced by an MR damper. Thus, the system 60 of the present invention is generally insensitive to common mode magnetic signals.

Although the invention is shown and described with respect to certain embodiments, equivalents and modifications will occur to those skilled in the art upon reading and understanding the specification. The present invention includes all such equivalents and modifications and is limited only by the scope of the claims.

What is claimed is:

1. A velocity sensing system comprising:
    a damper assembly having a central axis and comprising a damper body, said damper body being axially moveable between a first position and a second position;
    a magnet extending parallel with said central axis, said magnet having a magnetic axis radially oriented with said central axis; and
    a coil extending parallel to said central axis between the first position and the second position, said coil being stationary relative to the movement of the damper body and radially disposed relative to the damper body,
    wherein movement of said damper body with respect to said magnet induces a voltage in said coil.

2. The system of claim 1 wherein said coil is wrapped around said magnet.

3. The system of claim 1 further comprising a soft iron pole extending parallel to said central axis.

4. The system of claim 3 wherein said magnet is connected to said soft iron pole.

5. The system of claim 3 wherein said magnet and coil extend generally an entire axial length of said soft iron pole.

6. The system of claim 1 further comprising a dust tube, wherein said magnet and said coil are mounted on said dust tube.

7. The system of claim 6 wherein said dust tube includes a central axis aligned with said central axis of said damper assembly and said dust tube coaxially receives said damper assembly.

8. The system of claim 7 wherein said magnet and said coil extend generally an entire axial length of said dust tube.

9. The system of claim 1 wherein said damper assembly includes a magnetorheological fluid damper.

10. The system of claim 1 further comprising a control unit adapted to convert said voltage into a relative damper velocity.

11. The system of claim 1 wherein said coil includes a central axis that is oriented circumferentially with respect to said central axis of said damper assembly.

12. A velocity sensor comprising:
    a damper assembly extending along a central axis and comprising a damper body, said damper body being moveable between a first position and a second position;
    a magnet extending parallel to said central axis, said magnet having a magnetic axis radially oriented with said central axis; and
    a coil extending parallel to said central axis between the first position and the second position, said coil being stationary relative to movement of the damper body and radially disposed relative to the damper body,
    wherein said damper, magnet and coil form a three dimensional flux path such that flux density in said path is a function of a position of said damper body with respect to said magnet and coil.

13. The system of claim 12 wherein said coil is wrapped around said magnet.

14. The system of claim 12 further comprising a soft iron pole extending parallel with said central axis.

15. The system of claim 14 wherein said magnet is connected to said soft iron pole.

16. The system of claim 14 wherein said magnet and coil extend generally an entire axial length of said soft iron pole.

17. The system of claim 12 further comprising a dust tube, wherein said magnet and said coil are mounted on said dust tube.

18. The system of claim 17 wherein said dust tube includes a central axis aligned with said central axis of said damper assembly and said dust tube coaxially receives said damper assembly.

19. The system of claim 18 wherein said magnet and said coil extend generally an entire axial length of said dust tube.

20. The system of claim 12 wherein said damper assembly includes a magnetorheological fluid damper.

21. The system of claim 12 wherein the amount of flux corresponds a relative damper velocity.

22. A method for sensing velocity comprising the steps of:
    providing a damper assembly having a central axis and comprising a damper body;
    aligning a magnet and a coil with said central axis such that said magnet and coil extend parallel to said central axis and are radially disposed relative to the damper body; and
    moving said damper body relative to said magnet and coil axially between an first position and a second position, wherein the magnet and the coil extend between the first position and the second position so as to overlap the damper body in the first position and in the second position, whereby movement of the damper body induces a voltage in said coil.

23. The method of claim 22 further comprising the step of converting said voltage into a relative damper velocity.

* * * * *